(12) United States Patent
Solomon et al.

(10) Patent No.: US 8,096,712 B2
(45) Date of Patent: Jan. 17, 2012

(54) FIBER OPTIC SPLICE

(75) Inventors: Thomas Solomon, Dayton, OH (US);
Donald Johnson, Fairborn, OH (US);
Steven Mersch, Germantown, OH (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 695 days.

(21) Appl. No.: 11/977,022

(22) Filed: Oct. 23, 2007

(65) Prior Publication Data
US 2009/0103870 A1    Apr. 23, 2009

(51) Int. Cl.
*G02B 6/255* (2006.01)

(52) U.S. Cl. .................. 385/95; 385/96; 385/97; 385/98

(58) Field of Classification Search ............... 385/95, 385/96, 97, 98
See application file for complete search history.

(56) References Cited

U.S. PATENT DOCUMENTS

| | | | |
|---|---|---|---|
| 4,158,477 A | 6/1979 | Phillips et al. | |
| 4,544,234 A | 10/1985 | DeVeau, Jr. et al. | |
| 4,717,233 A | 1/1988 | Szkaradnik | |
| 4,940,307 A | 7/1990 | Aberson et al. | |
| 5,085,494 A | 2/1992 | Wesson et al. | |
| 5,189,717 A | 2/1993 | Larson et al. | |
| 5,469,522 A | 11/1995 | Fan | |
| 6,275,640 B1 * | 8/2001 | Hunsinger et al. | 385/135 |
| 6,338,579 B1 * | 1/2002 | Winiarski | 385/99 |
| 7,367,255 B2 * | 5/2008 | Brugger et al. | 83/879 |

OTHER PUBLICATIONS

ThorLabs, Inc., "Detailed Installation & Theory of ULTRAsplice," doc. # 2343-D01 rev. A, (Jan. 9, 1998) (http://www.fiberoptics4sale.com/pdf/Siemon%20Ultrasplice%20Assembly%20Instruction.pdf).
Scientific Instrument Services, Inc., "SHORTIX, A revolution in capillary column cutting," (printed Oct. 18, 2007) (http://www.sisweb.com/ms/sis/shortix.htm).

* cited by examiner

*Primary Examiner* — Jennifer Doan

(57) ABSTRACT

A splicing method and splicing kit are suitable for creating a multimode mechanical splice. The splice may be used, for example, in Aircraft Battle Damage Repair operations. The splice utilizes two cylindrical inner crimp sleeves and an outer crimping assembly. The inner crimp sleeves are placed over prepared fiber cable ends, and the fiber core is cleaved. The cable ends are then inserted into an outer cannula of the outer crimping assembly. The cannula guides the inner crimp sleeves, and the cleaved fiber ends enter a glass ferrule in the cannula. The glass ferrule has a triangular bore containing an index matching gel. A window in the cannula and a magnifying viewer are provided to visually confirm the splice quality. The fibers may be cleaved by forming a circumferential score on the fiber.

26 Claims, 8 Drawing Sheets

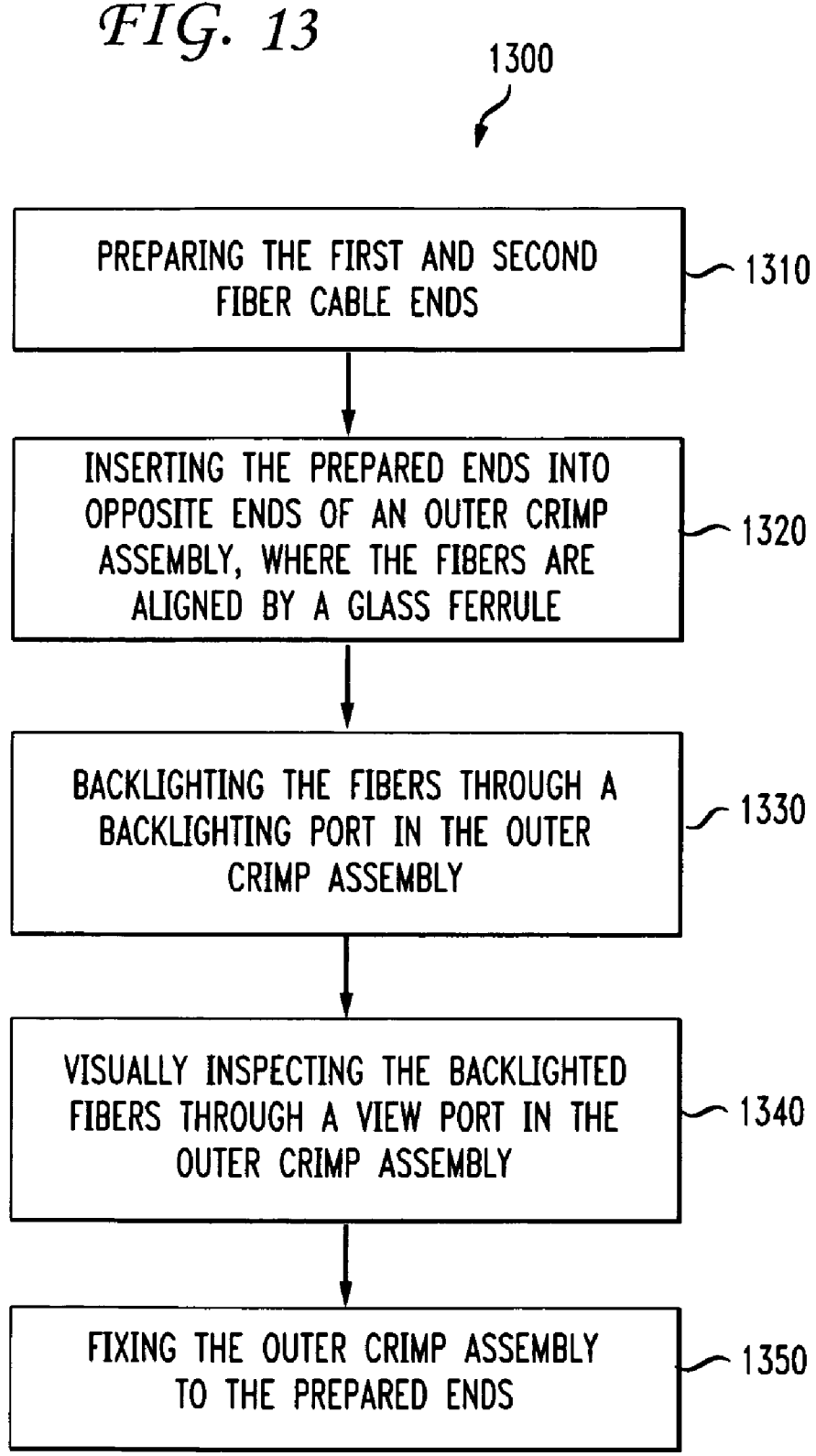

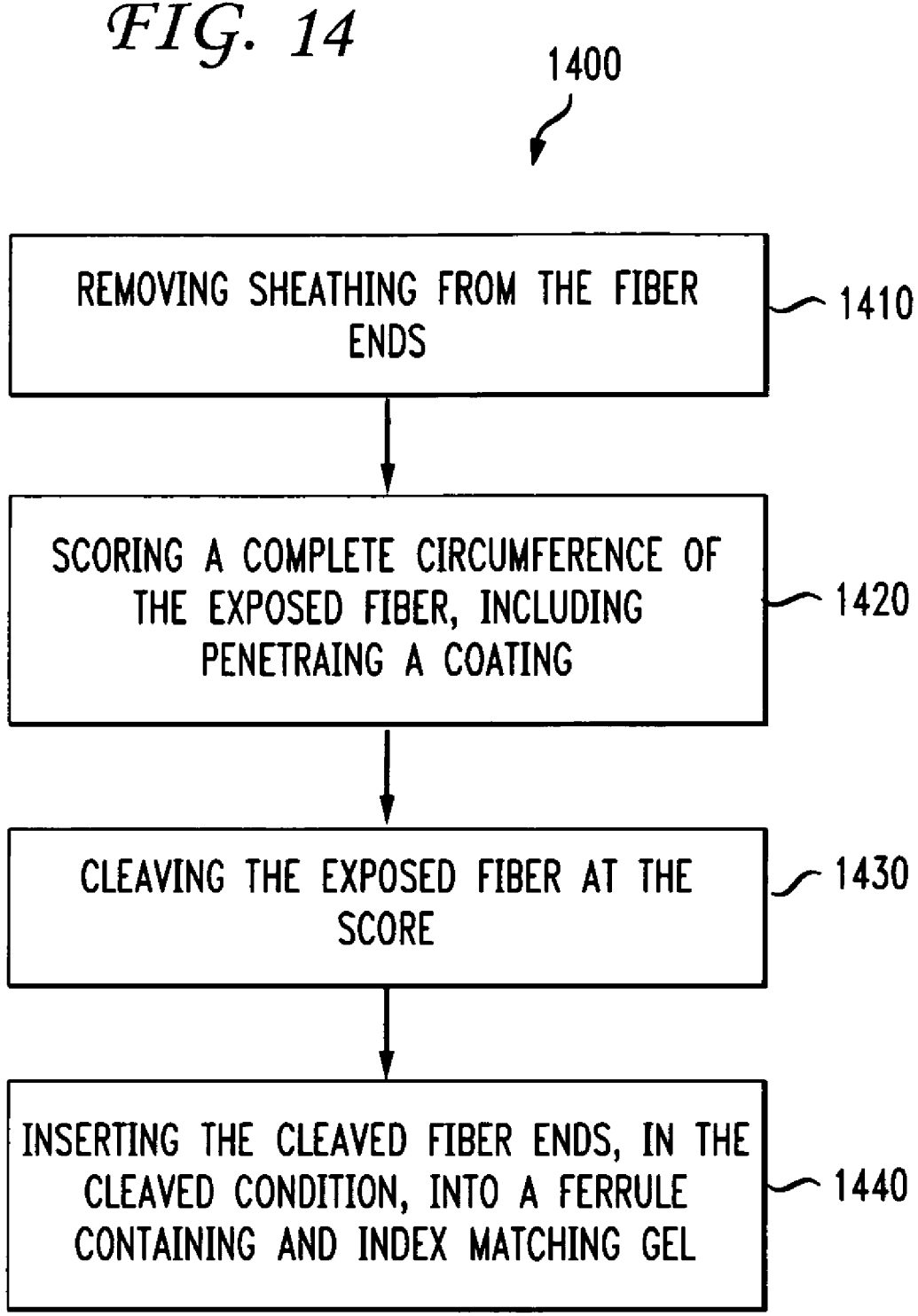

FIBER OPTIC SPLICE

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. F33615-02-D-2299 awarded by the United States Department of Defense/United States Air Force.

FIELD OF THE INVENTION

The present invention relates generally to the problem of splicing optical fibers. More specifically, the invention relates to splicing optical fibers under adverse conditions such as limited working space, limited available time and high quality requirements. Those conditions are typically encountered in Aircraft Battle Damage Repair operations.

BACKGROUND OF THE INVENTION

Fiber optics offers the avionics industry advantages of weight and stealth compared to traditional wiring. Local area fiber cables can provide a means of communication between the various avionics modules. The Air Force recognizes those advantages and has included fiber optics in the design of the F/A-22 aircraft and will continue to design fiber optics into aircraft upgrades and new aircraft designs. The ability to repair broken fibers will be critical to keeping those systems flight worthy.

As with standard wiring, it is very difficult to pull and replace complete runs of fiber cable within an aircraft. A much more attractive solution is to repair the cable at the damaged location. Standard fiber optic splice technology, however, is not adequate for avionics applications. The temperature range, mechanical forces, humidity variations and environmental conditions including salt, sand and smoke encountered in fighter jet operating conditions, cause standard fiber optic splices, such as those used in the standard telecommunications field, to fail.

There is therefore a need for an avionic fiber optic splice and splicing method for use in Aircraft Battle Damage Repair (ABDR), peace time repair, and maintenance of aging aircraft. The splice must be easy to install, must be installable in tight working conditions, must have a small cross section to avoid the necessity of staggered repairs, and must perform under the conditions experienced during fighter jet flights. A fiber splice that meets those requirements will find applications in all branches of military aircraft as well as within commercial aircraft.

The methods, splices and tools of the present invention were developed for use in ABDR on the F/A-22 aircraft, and are suitable for use with other aircraft and maintenance programs. They were developed to meet the following requirements.

1) The splice must be easy to install in the severely limited space encountered within the fighter jet.

2) The splicing method must provide visual feedback during the repair process in order to assure proper assembly and performance of the splice.

3) The cross section of the splice must be minimized in order to minimize the need of staggered splices. The use of staggered splices requires two splices per repair and each splice causes a loss in signal of 30% on average.

4) The splice must satisfy military performance specifications as set forth in MIL-PRF-24623C.

The performance requirements for an ABDR repair are less stringent than those for peace time repair. Basically, the performance of a peace time repair must match the original performance specifications. The ABDR repair, on the other hand, must quickly get the aircraft flight worthy but may have lower performance and lifetime specifications.

Fiber optic splices may be classified into four types: 1) multimode mechanical splice, 2) multimode fusion splice, 3) single mode mechanical splice, and 4) single mode fusion splice. "Single" and "multimode" are types of optical fiber. "Mechanical" and "fusion" are methods of splicing. The goal of the inventors in developing the present invention was to develop a multimode mechanical splice. Features of the invention, however, are suitable for use in any of the fiber optic splice classes.

A problem often encountered in the use of presently available fiber optic splicing techniques for ABDR is that the fibers to be spliced must be cleaved to a very precise length tolerance, and that the fiber ends must be perpendicular and smooth in preparation for splicing. In presently used techniques, the fiber ends are polished to meet those requirements. Those procedures present significant difficulties in an ABDR environment where working space is limited and time is of the essence.

Another difficulty with fiber optic splicing techniques presently available for avionics is that there is no real-time feedback to the operator regarding the actual alignment and positioning of the two cleaved fiber ends with respect to each other. That results in inconsistent results in splice quality, as measured by transmission loss through the splice. Such losses are not measurable until the splice is completed, and the entire splicing process must be repeated if the results are substandard.

Presently available techniques produce splices having outer diameters exceeding 0.20 inches, requiring the staggering of splices in many instances. Presently available techniques furthermore require the use of expensive custom-made tools, raising the per-splice overall cost.

In mechanical fiber optic splices, the glass fibers ends must be held securely in place against each other in the splice. That is currently done using high-strength adhesives to secure the glass fibers in sleeves that are mounted in the crimp assembly. Adhesives, however, are difficult to use under tight working conditions and have limited shelf life, requiring careful inventory control.

Frequently, fiber optic splice specifications, especially those used in peace-time applications, require that the splice meet minimum pull test standards. Meeting such standards almost always requires that the splice connects with a strength member of the cable in or immediately beneath the outer jacket. Known arrangements for connecting to the strength member, however, require a splice outer diameter that greatly exceeds the diameter of the fiber cable itself. If several adjacent fiber cables require splicing, those splices must then be staggered to avoid an excessively large overall diameter of the splice group. That situation may necessitate multiple splices on some cables.

There therefore remains a need for a cost-effective, reliable technique to splice optical fiber cables in an ABDR environment.

SUMMARY OF THE INVENTION

The present invention addresses the needs described above by providing methods and apparatuses for splicing first and second optical fiber cable ends. One method in accordance with the invention comprising the steps of preparing the first and second optical fiber cable ends and inserting the prepared first and second fiber cable ends into opposite ends of an outer splice assembly, wherein projecting fiber portions of the prepared fiber cable ends enter an alignment bore of a glass ferrule positioned in a central bore of the outer splice assembly as the prepared fiber cable ends are inserted. The projecting fiber portions are backlighted through a backlighting port in the outer splice assembly and through the glass ferrule. The backlighted projecting fiber portions are visually inspected through a view port in the outer splice assembly and through the glass ferrule. The outer splice assembly is fixed to at least one of the prepared first and second optical fiber cable ends.

In that method, the step of visually inspecting may further comprise installing a magnifier over the view port. The step of backlighting the projecting fiber portions may further comprise backlighting through a background optical diffuser contained in the magnifier. Installing the magnifier over the view port may further include clipping the magnifier to the outer splice assembly.

The step of preparing the first and second optical fiber cable ends may further comprise performing the following steps on each fiber cable end: removing from the optical fiber cable end a length of outer jacket to expose a length of inner jacket; removing a portion of the exposed length of inner jacket to expose a length of fiber; inserting the fiber cable end into a first end of a respective inner crimp sleeve, the inner crimp sleeve having a through bore with a large diameter section for receiving the exposed inner jacket and a small diameter section for receiving the exposed fiber, the exposed fiber projecting from a second end of the respective inner crimp sleeve to form the projecting fiber portion; crimping the inner crimp sleeve to secure the fiber end; and cleaving the projecting fiber portion a predetermined distance from the respective inner crimp sleeve.

The cleaving step may further include scoring a coating of the fiber. The cleaving step may comprise scoring around a complete circumference of the fiber at a cleave point.

The central bore of the glass ferrule may contain an index matching gel, and may have a triangular cross section. The central bore may include lead-in chamfers to guide the projecting fiber portions into the central bore.

The method may further comprise the steps of rotating the fiber ends relative to each other before fixing the outer splice assembly to the fiber cable ends; measuring signal strength across the splice during the rotating; and performing the fixing at a relative rotational position of the fiber ends resulting in a maximum signal strength.

The method may further include the step of applying an adhesive-lined shrink wrap sleeve over the splice after fixing the outer splice assembly to the fiber cable ends. The method may also include the step of capturing strength members of the first and second optical fiber cable ends.

Another embodiment of the invention is a splicing kit for splicing first and second optical fiber cable ends. The kit comprises an outer splice assembly including an outer cannula and a glass ferrule positioned in a central bore of the outer cannula. The glass ferrule has a fiber alignment bore for receiving first and second fiber ends of the first and second fiber cable ends, and the outer cannula defines a viewing port through a wall of the cannula in registration with the glass ferrule, and further defines a backlighting port through the wall of the cannula in registration with the glass ferrule. The viewing port and the backlighting port are in opposing positions on the cannula wall. The fiber alignment bore is in a line of sight between the backlighting port and the viewing port.

The kit may further comprise a viewing magnifier for viewing the central bore of the glass ferrule, the magnifier being configured for attachment to the outer splice assembly, the magnifier having a lens in registration with the viewing port and a background optical diffuser in registration with the backlighting port when the magnifier is attached.

The glass ferrule may further comprise lead-in chamfers at both ends of the alignment bore. The alignment bore may be triangular in cross section.

The kit may further include an index-matching gel contained within the central bore of the ferrule. The kit may comprise two inner crimp sleeves, each sleeve comprising a cylindrical body with an inner bore for receiving one of the first and second optical fiber cable ends and an outer diameter for fitting in the central bore of the outer cannula.

The central bore of each of the inner crimp sleeves may further comprise a single diametric step separating a first bore length sized to accept an inner jacket layer of the fiber cable, and a second bore length sized for accepting a core fiber of the fiber cable.

Another aspect of the invention is a method for preparing an optical fiber cable end for splicing, the optical fiber cable including at least one jacket layer, a core fiber and a protective coating on the core fiber. The method comprises the steps of removing the at least one jacket layer from the fiber cable end to expose the core fiber with its protective coating; scoring a complete circumference of the exposed core fiber to form a circumferential score, the circumferential score penetrating the protective coating and scoring an underlying surface of the core fiber; and cleaving the fiber at the score.

The step of scoring the exposed fiber may further comprise the steps of biasing a cutting blade against the fiber; and revolving the cutting blade about the fiber. The step of scoring the exposed fiber may further comprise the step of releasing the cutting blade bias using a thumb-activated button.

The method may further include the steps of axially positioning a shoulder on the optical fiber cable end against a reference stop of a fiber cleaving tool; and performing the scoring and cleaving steps at a predetermined distance from the reference shoulder. The cleaved fiber end, in the cleaved condition, may be inserted into a ferrule containing an index matching gel.

Another aspect of the invention is a fiber cleaving tool for cleaving an optical fiber extending from an end of an optical fiber cable. The optical fiber cable end includes a crimp sleeve crimped on the optical fiber and on an inner jacket of the fiber cable. The tool comprises a tool housing and a thumbwheel assembly mounted in the housing for rotation about a thumbwheel rotation axis. The thumbwheel assembly defines a through bore extending coaxially with the thumbwheel rotation axis, the through bore having a fiber alignment section sized for accepting an optical fiber and a crimp sleeve alignment section sized for receiving the crimp sleeve; the bore further including a sleeve reference surface for axially locating the cable end in the bore. The thumbwheel assembly further comprises a thumbwheel for rotating the thumbwheel assembly about the thumbwheel rotation axis; a back support aligned with the fiber alignment section of the through bore for supporting one side of an optical fiber extending from the fiber alignment section; and a scoring blade supported on the thumbwheel assembly for motion toward and away from the back support; whereby the optical fiber extending from the fiber alignment section may be trapped between the scoring blade and the back support.

The fiber cleaving tool may further comprise a fiber securing clamp connected to the tool housing for preventing movement of the fiber when the thumbwheel assembly is rotated. A biasing element may be included for biasing movement of the scoring blade in a direction toward the back support.

The fiber cleaving tool may further comprise a blade release button for moving the scoring blade away from the back support. The through bore may further include a conical fiber insertion guide for guiding the fiber into the fiber alignment section of the through bore.

The present invention is furthermore directed to a crimp sleeve for preparing an optical fiber cable end for mechanical splicing, the optical fiber cable including an outer jacket layer, an inner jacket layer and a core fiber. The crimp sleeve comprises a crimpable outer metallic cannula defining an axial through bore; and an inner crimp liner of polyetheretherketone (PEEK) having a cylindrical outer surface secured within the through bore of the outer metallic cannula, the PEEK crimp liner defining an inner bore substantially coaxial with the cylindrical outer bore, the inner bore including at least a first section with a first inner diameter for slidingly receiving the core fiber.

The metallic cannula may comprise a material selected from a group consisting of stainless steel and Inconel®. The inner crimp liner may be secured within the through bore of the outer metallic cannula with an adhesive. The inner bore of the inner crimp liner may further comprise a second section having a second inner diameter for receiving the inner jacket layer, and a tapered lead-in between the first and second sections for guiding the fiber core into the first section of the bore.

Another aspect of the invention is a method of securing an optical fiber for use in a mechanical splice. The method includes the steps of inserting the optical fiber into a crimp bore of a polyetheretherketone (PEEK) crimp liner, the fiber slidingly fitting into the bore; and crimping a metallic cannula surrounding the crimp liner, thereby frictionally securing the fiber within the bore.

The metallic cannula may be selected from a group consisting of stainless steel tubing and Inconel® tubing. The crimp liner may be secured within the metallic cannula with an adhesive.

The method may further comprise the steps of stripping a section of an inner jacket of an optical fiber cable containing the optical fiber, to expose the optical fiber; and inserting a remaining portion of the inner jacket into an inner jacket counter bore of the PEEK crimp liner aligned with the crimp bore.

The method may further comprise the step of guiding the fiber core into the crimp bore using a tapered lead-in between the inner jacket counter bore and the crimp bore.

Yet another aspect of the invention is a splicing kit for splicing first and second optical fiber cable ends. The kit includes an outer splice assembly including a cylindrical outer cannula and a glass ferrule positioned in a central bore of the outer cannula. The glass ferrule has a fiber alignment bore for receiving first and second fiber ends of the first and second fiber cable ends, and the outer cannula has a single outer diameter for its length. The kit further includes first and second inner crimp sleeves, each sleeve comprising a cylindrical body with an inner bore for receiving one of the first and second optical fiber cable ends and an outer diameter for fitting in the central bore of the outer cannula adjacent the glass ferrule. First and second strength fiber ferrules are included for inserting inside a strength fiber layer of the fiber optical cable; the outer cannula having a length sufficient to accommodate the strength fiber ferrules on sides of the inner crimp sleeves opposite the glass ferrule. The cannula is crimpable over the first and second inner crimp sleeves and the first and second strength fiber ferrules.

The kit may further comprise a polyimide sleeve for surrounding the strength fiber of the optical fiber cable along a length of the ferrule.

The central bore of each of the inner crimp sleeves may further comprise a single diametric step separating a first bore length sized to accept an inner jacket layer of the fiber cable, and a second bore length sized for accepting a core fiber of the fiber cable.

The present invention is further directed to a method for splicing first and second optical fiber cable ends. The method includes preparing the first and second optical fiber cable ends by exposing lengths of a core glass fiber, an inner jacket layer, and a strength fiber layer; inserting a metallic ferrule between each exposed length of strength fiber layer and an underlying length of inner jacket layer; inserting each fiber cable end into a first end of a respective inner crimp sleeve, the inner crimp sleeve having a through bore with a large diameter section for receiving the exposed inner jacket and a small diameter section for receiving the exposed fiber, the exposed fiber projecting from a second end of the respective inner crimp sleeve to form a projecting fiber portion; crimping each inner crimp sleeves to secure a fiber end; and cleaving the projecting fiber portions a predetermined distance from the respective inner crimp sleeve. The prepared first and second fiber cable ends are inserted into opposite ends of a cannula having a single outer diameter for the length of the cannula, wherein projecting fiber portions of the prepared fiber cable ends enter an alignment bore of a glass ferrule positioned in a central bore of the cannula as the prepared fiber cable ends are inserted. The cannula is crimped over each of the inner crimp sleeves and each of the metallic ferrules to fix the core glass fibers and the strength fiber layers to the cannula.

The method may further include the step of assembling a polyimide sleeve over the strength fiber layer before inserting the prepared fiber ends into the cannula.

The method may additionally include the step of applying an adhesive-lined shrink wrap sleeve over the splice after fixing the outer splice assembly to the fiber cable ends.

BRIEF DESCRIPTION OF THE DRAWINGS

FIG. 13 is a flow chart showing a method according to one embodiment of the invention.

FIG. 14 is a flow chart showing a method according to one embodiment of the invention.

DESCRIPTION OF THE INVENTION

Figure 1:
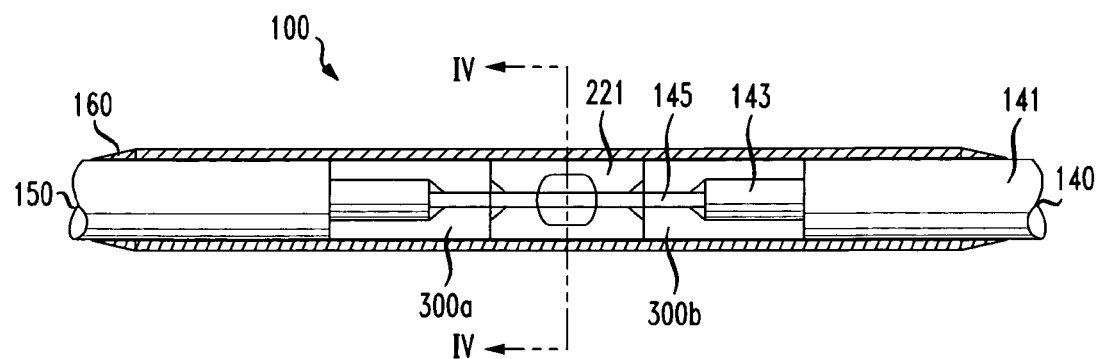
FIG. 1 is a schematic view of a fiber cable splice according to one embodiment of the invention.
Figure 7:
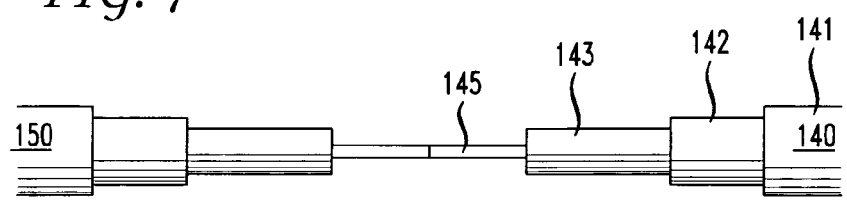
FIG. 7 is a schematic view of two fiber cable ends that may be spliced using the methods and apparatuses of the invention.

The present invention overcomes the above-described problems with several methods and apparatuses relating to a novel multimode mechanical splice. A splice assembly 100 according to one embodiment of the invention with optical fiber cables 140, 150 in place is shown in FIG. 1. As used herein, the term "optical fiber cable" refers to an optical fiber core together with the protective and isolating layers surrounding the fiber. A typical optical fiber cable 140, shown separately in FIG. 7, includes an optical fiber core 145, a hermetic coating (not shown) of polyimide applied directly to the optical fiber core, an inner jacket layer 143 typically comprising a modified ETFE (ethylene-tetrafluoroethylene) fluoropolymer such as Tefzel® manufactured by DuPont, an aramid fiber mesh strength member (fabricated, for example, from Dupont Kevlar® fibers) 142 and an outer jacket 141.

Returning to FIG. 1, the splice assembly 100 is shown joining the ends of two optical fiber cables 140, 150. The basic elements of the splice assembly 100 of the invention include two inner crimp sleeves 300a, 300b that are assembled to the ends of the fiber cables 140, 150 by crimping to the optical fiber core 145 itself, as described below. The splice assembly 100 further includes an outer crimp assembly 200 including a glass ferrule 221. A shrink wrap element 160 may be applied to the finished crimp assembly 100 to protect it from the environment.

Figure 2:
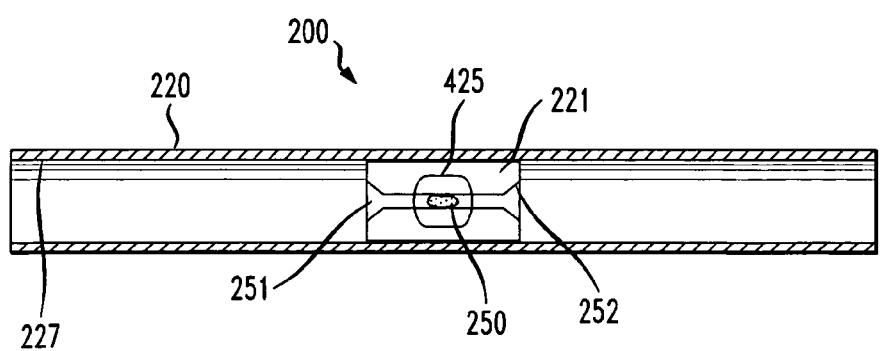
FIG. 2 is a schematic view of an outer crimp sleeve according to one embodiment of the invention.

The outer crimp assembly 200 of FIG. 1 is shown separately for clarity in FIG. 2. The assembly comprises a precision stainless steel tube or cannula 220 having a wall defining an inner bore 227. The cannula may be made from stainless steel or from Inconel® austenitic nickel-based superalloy, or from other suitable crimpable metallic materials. Inconel® is preferred due to its low thermal coefficient of expansion.

The cannula defines a view port 425 and a backlighting port 426 (FIG. 4) extending through the wall and located in the center of the cannula 220. The view port 425 and the backlighting port 426 are located in diametrically opposite positions in the wall of the cannula 220. Returning to FIG. 2, a precision glass ferrule 221 is affixed in the inner bore 227 at the center of the cannula 220 and provides alignment of the joining optical fibers. The ferrule 221 may be secured to the cannula 220 using a high grade adhesive. The ferrule 221 is preloaded with high viscosity silicone index matching oil 250. The view port 425 and the backlighting port 426 are in registration with the glass ferrule 221 so that the actual coupling of the fibers may be viewed through the view port as the splice is being installed, as described in more detail below.

Figure 3:
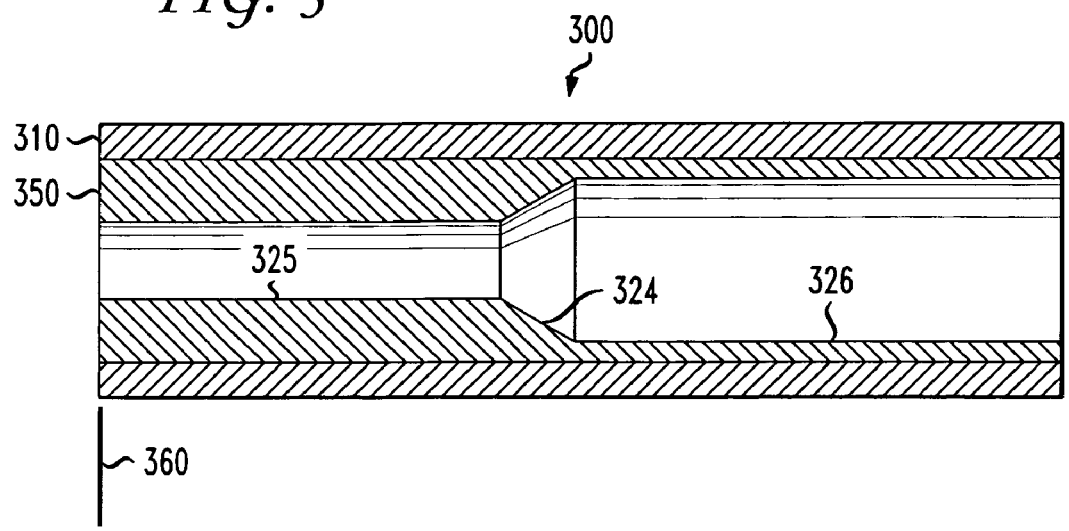
FIG. 3 is a sectional view of an inner crimp sleeve according to one embodiment of the invention.

An inner crimp sleeve 300 according to the invention is shown in FIG. 3. The crimp sleeve 300 comprises a crimpable metallic cannula 310 made from stainless steel, Inconel® or another material with similar properties. Inconel® is preferred for its thermal properties. Affixed within the cannula 310 is a section of precision polyetheretherketone (PEEK) micro bore tubing forming an inner crimp liner 350. A high grade adhesive may be used to fix the PEEK liner to the inner wall of the cannula.

The central through-bore of the inner crimp liner 350 is machined to include a larger diameter section 325 at a first end of the crimp sleeve 300, and a smaller diameter section 326 at a second end of the sleeve. The two bore sections 325, 326 are separated by a step 324. There are two inner crimp sleeve components 300 included in each splice, one for each fiber end being spliced.

The prepared fiber end is fed through and crimped within the inner crimp sleeve 300. The section 326 of the bore having a larger diameter is sized to accept the Tefzel® inner jacket layer 143 of the fiber cable after removal of the outer jacket (see also FIG. 1). The section 325 of the bore having a smaller diameter is sized to accept the core fiber, which protrudes from the inner crimp sleeve 300 and is later cleaved as described below. Between the two bore sections 325, 326 is a tapered guide section 324 for guiding the core fiber into the smaller section 325. After the glass fiber is inserted into the bore 325 of the inner crimp liner 350, and the inner jacket layer bottoms on the tapered guide section 324, the metallic cannula 310 is crimped, securing the glass fiber in place. After the glass fiber is crimped, a shoulder 360 of the inner crimp sleeve serves as a reference locator during subsequent operations in the splicing process.

The use of a polyetheretherketone (PEEK) material as the glass fiber holding material of the inner crimp liner 350 provides a significant improvement over techniques used in the past for that purpose. For example, adhesives were often used to secure the glass fiber within the splice. For an avionic splice the use of adhesives is undesirable due to the shelf life, consistency of results (performance) and the skill required to properly use it.

The inventors have discovered that the fiber may be secured without adhesives by mechanically securing it with crimp pressure applied directly onto the glass fiber. That technique, however, requires a material that will not damage the glass fiber when the pressure to secure it is applied, while securely gripping the fiber. To the inventors' knowledge, until the inventors' development of the present invention, no such material had been identified. In the crimp sleeve of the present invention, the material within the inner crimp sleeve that directly contacts the glass fiber is the PEEK material.

PEEK is a high temperature engineering thermoplastic designed to withstand high pressure and temperature levels. PEEK is semi-flexible and is insoluble in virtually all organic and inorganic solvents. It has good dielectric properties and can be machined to the desirable shape or extruded with high precision. It readily stands up to shock, abrasions and impacts.

The inventors have discovered that those features are useful in a mechanical optical fiber splice. The PEEK material is strong and stable, yet is soft enough not to damage the glass fiber when it is crimped onto the fiber. Additionally, it has a high coefficient of friction that results in the fiber being held firmly by the inner crimp sleeve. Pull testing results show a 10 pound holding force achieved by the crimped inner crimp sleeve on the glass fiber.

Returning to FIG. 1, the prepared fiber ends, including the inner crimp sleeves 300a, 300b, are fed into the outer crimp assembly 200 until the inner crimp sleeves 300a, 300b are stopped by the glass ferrule 221. The inner crimp sleeves are then crimped in place within the outer crimp assembly by crimping the cannula 220 (FIG. 2). Finally, the adhesive lined heat shrink wrap 160 (FIG. 1) is applied over the outer crimp assembly to seal the splice.

The embodiment of the invention shown in FIGS. 1 and 2 does not attach directly to the aramid strength fibers of the cable. Instead, the length of strength fibers exposed in stripping back the outer jacket is removed. That configuration provides simplicity, ease and speed of assembly. The aramid fibers are trimmed back after removal of the outer jacket.

Figure 8:
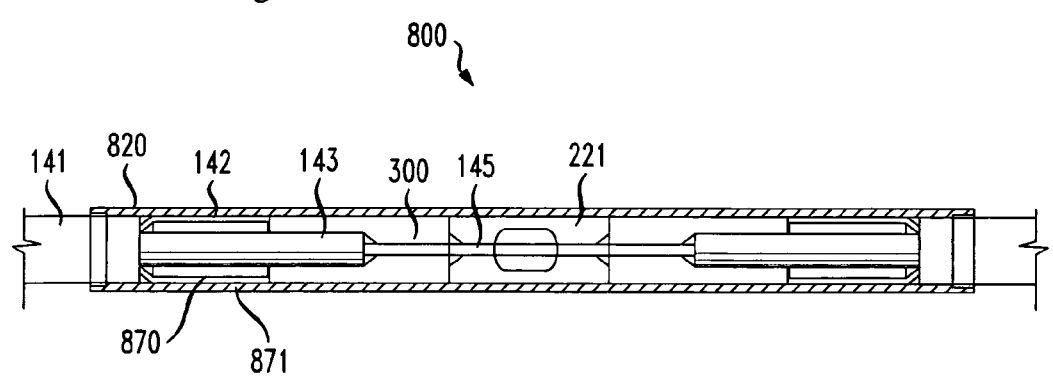
FIG. 8 is a schematic view of a cable splice according to one embodiment of the invention.
Figure 9A:
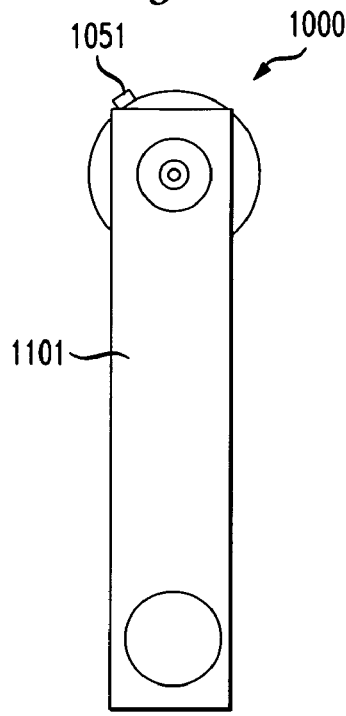
FIG. 9a is a side view of a fiber cleaving tool according to one embodiment of the invention.
Figure 9B:
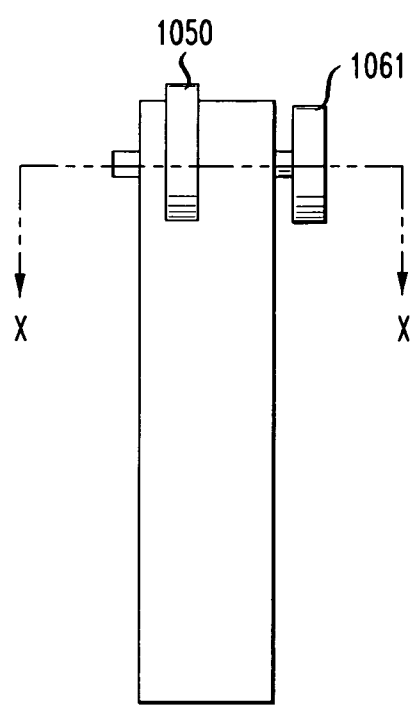
FIG. 9b is a front view of a fiber cleaving tool according to one embodiment of the invention.
Figure 10:
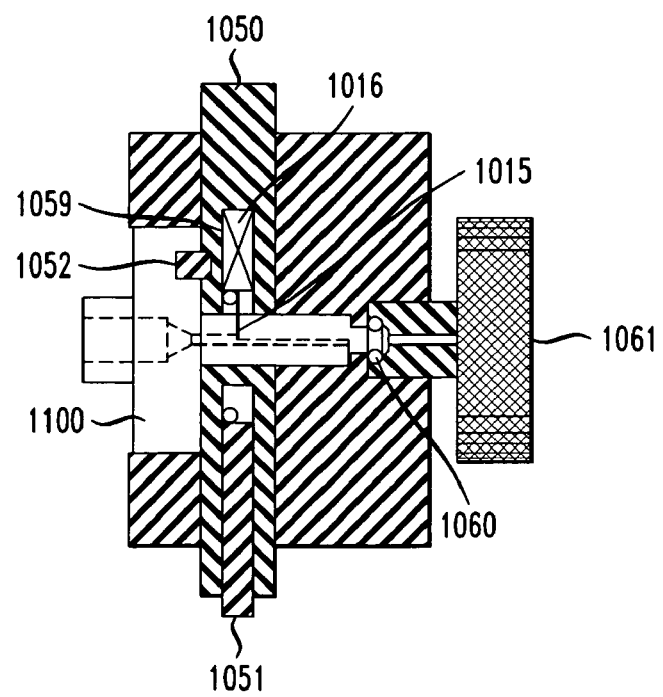
FIG. 10 is a sectional view of a fiber cleaving tool according to another embodiment of the invention.

The splice of the present invention may alternatively be adapted for permanent splice repair by attaching the splice directly to the aramid strength fibers, as shown in FIG. 8. In the fiber optic splice 800 shown in FIG. 8, an elongated outer cannula 820 is used in conjunction with a glass ferrule 221 and inner crimp sleeves 300 similar to those described above with reference to FIG. 1. A length of aramid strength fiber 142, however, is left intact after removing a portion of the outer jacket 141. Before the inner crimp sleeve 300 is assembled over the fiber end, a stainless steel ferrule 870 is inserted between the inner jacket 143 and the aramid strength fiber 142. The strength fiber 142 is typically in the form of a web or mesh that may be expanded to accommodate the ferrule 870. A thin polyimide sleeve 871 may be assembled over the mesh to provide increased frictional purchase between the metallic outer cannula 870 and the aramid strength fiber 142.

The outer cannula 820 is then crimped over both the metallic ferrule 870 and the inner crimp sleeve 300. The inner crimp sleeve locks the glass fiber 145 in place, as described above. The compression of the strength fiber 142 locks the optical fiber cable in the splice with a strength approaching that of the aramid fibers. The resulting splice is expected to meet the requirements of section 3.5.13 of the MIL-PRF-24623C Performance Specification Splice, Fiber Optic Cable, which defines permanent (not ABDR) avionics splices. That specification requires a cable pull out force of 88 N (20 pounds) for splices attaching directly to cable components.

The glass ferrule 221 (FIG. 2) is the means for holding the fibers in alignment with respect to each other. The ferrule is preferably cylindrical, having an outside diameter for fitting into the bore 227 of the cannula 220. The ferrule is fixed mid-way along the length of the cannula, using an adhesive, or by press fitting or crimping or by some other technique. An alignment bore 251 is formed along a longitudinal axis of the ferrule 221 for receiving the core fiber ends.

The alignment bore 251 of the glass ferrule 221 has tapered inlets 252 on both ends for funneling the fiber end into the ferrule. As the prepared fiber is inserted into the outer crimp assembly the taper facilitates inserting the fiber into the alignment bore of the ferrule.

Figure 4:
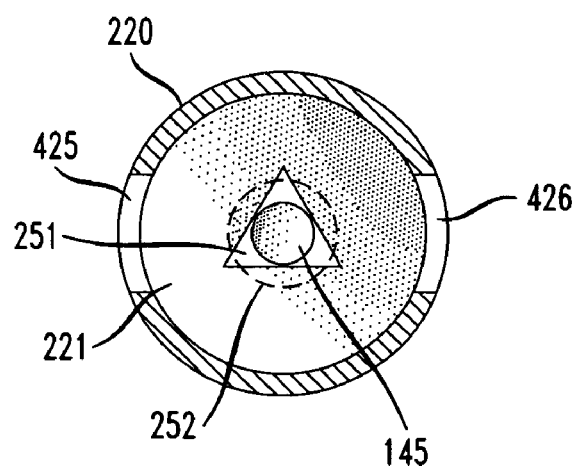
FIG. 4 is a sectional view through a fiber cable splice at section line IV-IV shown in FIG. 1.

The alignment bore 251 may have a triangular or other polygonal cross section for precision alignment of the fiber and relief of "pistoning." For example, a section through a ferrule 221 having an alignment bore 251 with a triangular cross-sectional shape is shown in FIG. 4. The triangular shape provides a three point guide for positioning of the core fiber 145. A three-point contact is the ideal mechanical scenario for accurate positioning.

Additionally, the triangular or other polygonal design allows relief of pistoning. The bore 251 is filled with a high viscosity silicone oil that serves as an index matching fluid. After one fiber 145 has been positioned in the ferrule, advancement of the second fiber into the ferrule requires a means of displacing the silicone oil that currently fills the bore. The triangular design allows the oil to be displaced by flowing out through the three point areas of the triangle while the fiber is inserted. A similar advantage is seen with other polygonal cross-sectional shapes.

The silicone oil 250 (FIG. 2) is placed in the alignment bore for fiber index matching. The silicone oil acts as an optical index matching fluid. The fluid helps minimize optical loss in the splice. In a preferred embodiment of the invention, the index matching fluid is a silicone oil manufactured by Specialty Silicone Products, Inc., part no. SSP1400.

Ideally, the refractive index of the fluid matches that of the fiber. The refractive index of the fiber is 1.45 and the refractive index of the silicone is 1.51. If there were no index matching fluid present Oust air present with a refractive index of 1.00) then the splice would have at least a 10% optical loss caused by the refractive index changes for the light traveling from glass to air to glass. If the index matching fluid had a refractive index of 1.45 then that loss component could theoretically be reduced to zero. Using the preferred silicone oil of the invention results in a refractive index difference of 0.06. That difference causes an optical loss of at least 0.04%. The silicone oil was selected as an index matching fluid due to its excellent optical clarity, its temperature stability and its environmental stability. The slight mismatch in refractive indices that results in the 0.04% loss is an acceptable compromise for the other superior properties of the silicone oil.

The apparatus and method of the present invention provide for magnified viewing of the area of joining of the two fibers of the mechanical splice for achieving optimal splice performance.

As shown in FIGS. 2 and 4, the outer crimp sleeve is designed with two oval ports including the visualizing port 425 and backlighting port 426, one through each of the opposing walls of the cannula 220. Centered between the ports 425, 425 is the precision glass ferrule 221 located within the cannula 220. The two ends of the fibers 145 being spliced will be located and centered within the opening 251 of the ferrule 221. By having the two ports 425, 426 in opposing walls of the cannula 221, the mating of the two fiber ends can be back illuminated, providing an optimized view of the joining of the two fiber ends, and providing visual feedback to the operator regarding the critical positioning of the two fiber ends.

Figure 5:
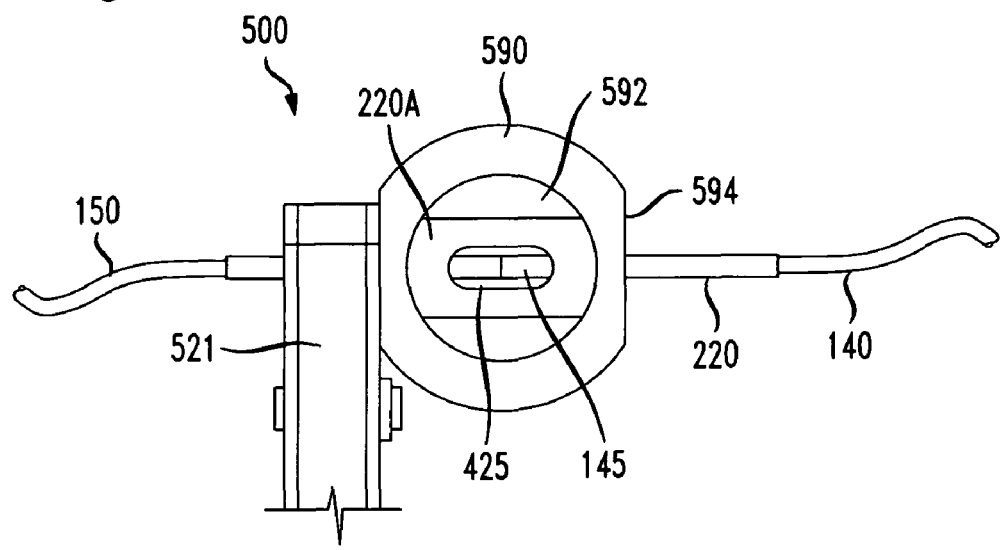
FIG. 5 is a diagrammatic view of a fiber cable splice including a splice view magnifier and crimping tool according to one embodiment of the invention.
Figure 6:
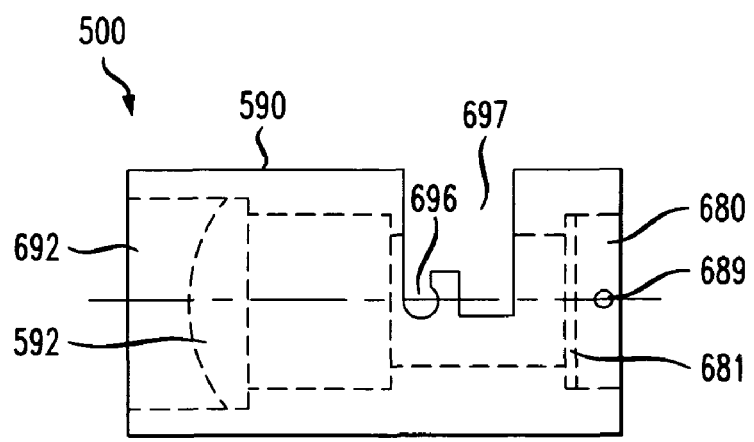
FIG. 6 is side view of a crimp magnifier according to one embodiment of the invention.

A magnifier 500, shown in FIGS. 5 and 6, is designed to work with the visualization port and backlighting port, and is used to provide a clear image of the two fiber ends. The magnifier clips onto the cannula 220 of the outer crimp sleeve ensuring optimal focus and hands free positioning. The magnifier 500 is clipped onto the outer cannula 220 before one or both fiber cable ends 140, 150 are secured to the outer cannula 220.

The magnifier 500 has a magnifying lens 592 in the bore 692 (FIG. 6) of the magnifier body 590. The magnifying lens 592 is aligned with the viewing port 425 when the magnifier is attached to the outer crimp sleeve 220. The magnifier 500 further has an optical diffuser 681 in the bore 680 (FIG. 6) in the housing 590 for providing a uniform backlighting of the magnified image. The image seen in the lens 592 includes a magnified portion 220A of the outer cannula, the viewing port 425 and the two fiber ends 145. The background optical diffuser 681 significantly clarifies the image and improves the quality of the view of the fiber joint. The image provides confirmation of the positioning of the fiber ends 145 as well as the quality of cleaves of each fiber and how well they abut each other.

The view of FIG. 5 shows a fiber cable end 150 inserted into position from the left. A fiber cable end 140 on the right is already crimped into position. Once the two fiber ends 145 are confirmed to be properly aligned and abutted, the left side fiber cable end 150 is then crimped using the tool 521. A trained operator can determine from the image in the magnifier whether performance of the completed splice will be acceptable. The trained operator can also make a determination from the image whether there is a problem with the splice and can decide whether to proceed or to restart.

The sectional view of the magnifier 500 shown in FIG. 6 includes a clip 696 in an opening 697 on a side of the magnifier housing 590. A fiber in the clip 696 is aligned between the magnifying lens 592 and the diffuser 681, providing a focused view of the fiber alignment process. A light source such as the LED 698 may be used to back-illuminate the fiber. Alternatively, natural or ambient light may be used.

Returning to FIG. 5, if a determination is made that the splice is acceptable, then the outer cannula 220 is crimped onto the inner crimp sleeves to secure the fiber cable ends 140, 150. Mechanically flat sides 594 are located on sides of the magnifier housing 590 to act as a reference surface guide provide locating stops for a crimping tool 521. The crimping tool is placed against the flat side of the magnifier during crimping. This ensures that the crimp is placed at the optimal location on the outer crimp sleeve.

In addition to the visual feedback provided by the viewing port and magnifier, a technician may also, if possible, directly measure optical signal losses across the splice before final crimping. To improve the splice quality, the fiber ends 140, 150 may be rotated relative to each other in the outer splice cannula 220, while monitoring optical signal strength, to determine the relative rotational position yielding the lowest signal loss. The splice is then crimped in that position. While the ability to perform such a measurement results in improved average splice quality, it may not be possible in all scenarios.

Another aspect of the invention is the use of a special fiber cleaver tool in achieving a good mechanical splice. The core fiber of an avionic fiber cable has a hermetic coating of polyimide. Removal of the polyimide coating is a difficult task at best. The inventors have chosen not to remove the coating during the splicing process because removing it would seriously detract from the ease and speed of the splice procedure as well as degrade performance of the splice. The inventors have instead chosen to prepare the fiber for splicing with the polyimide coating in place.

Leaving the polyimide coating, however, means that the cleave tool used in scoring and cleaving the fiber must function with the polyimide in place. Typical fiber cleaving tools use a hard crystal blade to place a very small nick on one side of the fiber. The fiber is then bent so that the nick causes the propagation of a cleave across the fiber.

In accordance with the present invention, the blade of the cleaving tool travels completely around the fiber to cut through the polyimide, and simultaneously places a circumferential score on the fiber. For cleaving the polyimide coated quartz fiber, the inventors have adapted and modified a tool originally designed to cut micro sized polyimide coated quartz tubing. It is a one-handed tool that is simple to use and results in reliable, quality fiber cleaves. The tool modified by the inventors is a Shortix™ Capillary Column Cutter, manufactured by Scientific Glass Technology of Middelburg, The Netherlands.

The cleaving tool 1000 of the invention, shown in FIGS. 9a-12, scores a complete circumference of the fiber while simultaneously cutting through the polyimide coating. Because the tool creates a circumferential score, in contrast to the single nick created by presently used cleaving tools, the resulting cleave surface is more perpendicular to the fiber axis and is flatter than that formed in a cleave from a single nick on a single side of the fiber. That improved optical fiber cleaving process eliminates the necessity of polishing the cleaved fiber end, as is routinely done in current splicing methods. Instead, the cleaved fiber ends created in the method of the invention are inserted in their cleaved condition (i.e., not polished) into the ferrule containing the index matching gel.

Performing fiber preparation for a splice in the field requires that the fiber cleaving tool be small, easy to use and preferably operable with one hand so that the other hand is free for holding and securing the fiber within the cleaver. The fiber optic cleaver 1000 developed by the inventors performs all of those functions.

The cleaver 1000 includes a handle 1001 that provides a grip for one-handed operation, houses the other components and provides bearing surfaces for rotation of the rotating parts. The handle 1001 may be machined form aluminum or steel, or may be molded or machined thermoplastic.

The cleaver uses a scoring blade 1015 made from diamond, carbide or a similar material. The blade is biased by a spring 1016 toward the optical fiber. The blade 1015 is mounted for rotation with the thumbwheel 1050, whereby the blade revolves around the glass fiber when the thumbwheel is rotated. The fiber is held stationary within the tool as the blade revolves around the circumference of the fiber.

The cleaver includes fiber securing means for preventing movement of the fiber along its axis during scoring. In the embodiment shown in FIG. 10, an O-ring 1060 is compressed around the fiber when a locking button 1061 is advanced into the assembly. The fiber securing means optimizes the quality of the cleaved fiber end. The cleaver also includes an internal stop shoulder 1108 (FIG. 11) so that when the fiber cable end is inserted into the tool and the inner crimp sleeve abuts the stop, the core fiber is cleaved at exactly the desired distance from the inner crimp sleeve. The thumb wheel that allows rotation of the scoring blade also includes a blade release button 1051 (FIG. 10) that moves the blade away from the center of rotation when the button is depressed, allowing loading of the fiber to be cleaved.

Figure 12:
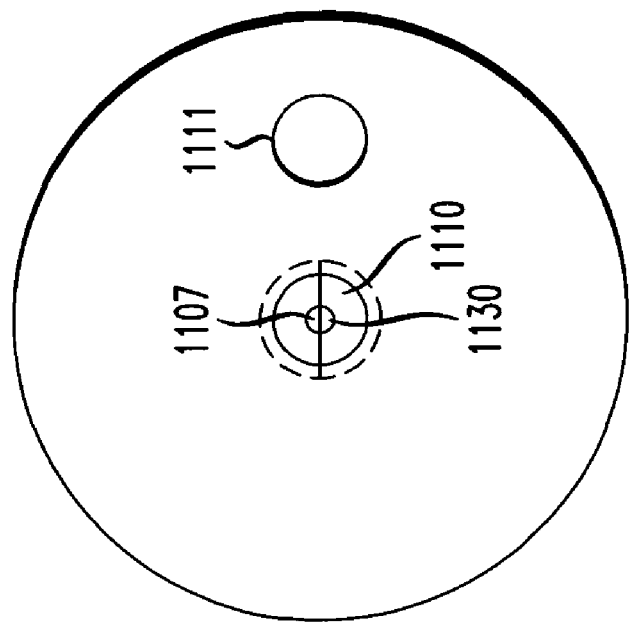
FIG. 12 is another side view of a thumbwheel rotor of a fiber cleaving tool according to another embodiment of the invention.
Figure 11:
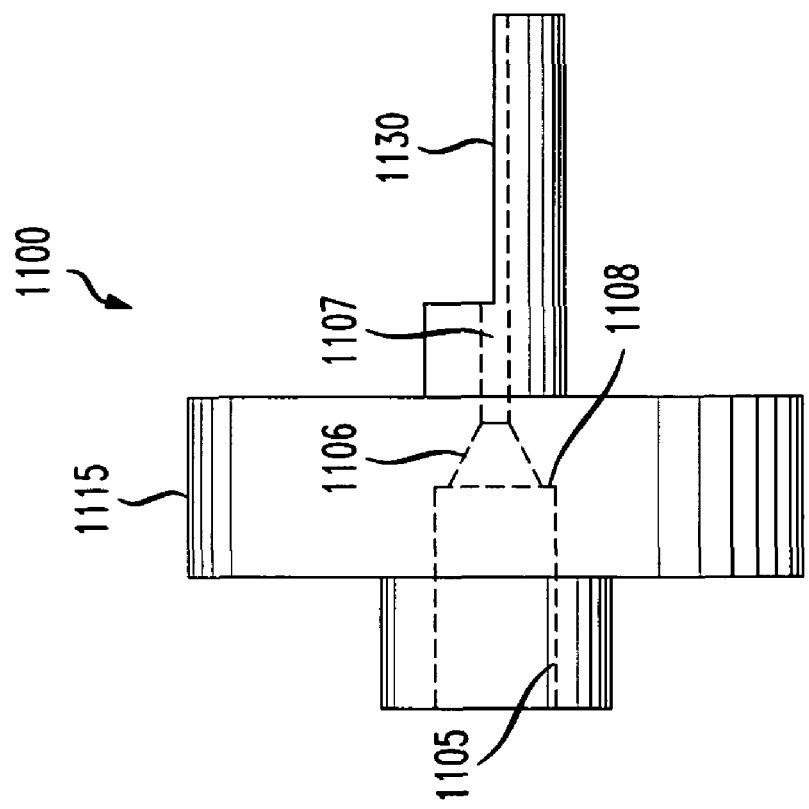
FIG. 11 is a side elevational view of a thumbwheel rotor of a fiber cleaving tool according to another embodiment of the invention.

The thumbwheel 1050 is mounted for rotation with a thumbwheel rotor 1100. An enlarged depiction of a thumbwheel rotor 1100 of the cleaver is shown in FIGS. 11 and 12. That component may be machined or molded from a thermoplastic material such as ABS or an acetel (preferably black Delrin®). The use of a thermoplastic material reduces damage to the fiber during the scoring process. The thumbwheel rotor 1100 includes a thumb wheel mounting disc 1115 for mounting the knurled thumbwheel 1050 (FIG. 10) for rotation by an operator. A dowel hole 1111 is provided for a dowel 1052 (FIG. 10) for rotationally locking the thumbwheel 1050 to the rotor 1100.

A fiber straightness guide 1105 receives an end of the fiber cable and has a diameter to closely fit the outer diameter of the inner crimp sleeve of a prepared cable end to maintain alignment of the fiber during the scoring process. The reference stop 1108 provides an axial reference location for the shoulder 360 (FIG. 3) of the inner crimp sleeve to establish a precise dimension between the inner crimp sleeve and the cleave point on the fiber.

A tapered fiber insertion guide 1106 guides the glass fiber into a fiber support diameter 1107. A fiber support section 1110 of the rotor 1100 is located in the assembly opposite the scoring blade. The fiber support section 1110 includes a semi-circular fiber support groove 1130 to support the flexible fiber in reaction to forces exerted on the fiber by the scoring blade, and to prevent lateral movement of the fiber under the scoring load. The scoring blade and fiber support section both rotate with the thumbwheel and are maintained on opposite sides of the fiber.

The goals of easy installation and operator feedback are advanced by providing several intuitive stops in the assembly process. Only one measurement is made during the entire splice process and that measurement is non-critical. Specifically, that measurement is a 1.5" length of fiber outer jacket that is initially stripped off the fiber cable. A stop is then used in the inner jacket stripper to ensure proper strip length of the inner Tefzel® jacket layer. The inner crimp sleeve is designed to be placed fully down over the inner jacket. As described above, the fiber cleaver has an internal stop for proper cleave length, and the visualization port magnifier has a flat reference surface 594 for positioning the crimp tool for proper crimp location. All of those stops make the splice procedure easy and effective.

A splice tool kit for performing the splicing method of the invention includes primarily standard tools, with several modified tools. The tool kit includes a fiber cable outer jacket stripper (this is a standard wire stripper); a Kevlar® (FOKC) cutter for cutting the aramid strength fibers and for general cutting of the fiber optic cable; an inner jacket Tefzel® layer stripper which exposes the optical fiber core; a single crimping tool that handles all required splice crimps; a visualization port magnifier that clips onto the outer crimp assembly; and a fiber cleaving tool that is an adapted quartz tube cutter as described above. Those tools are assembled in a Pelican case along with a number of splice kits containing the consumable components. The contents of the splice kit include one outer crimp assembly, two inner crimp sleeves, and one heat shrink sleeve.

A method 1300 according to one embodiment of the invention for splicing an optical fiber is shown in outline form in FIG. 13. The damaged area of the fiber optic cable is first removed using FOKC cutters that are provided in the tool kit. A minimum length of fiber is removed with the damaged area.

The first and second fiber ends are then prepared (step 1310) for splicing. Using the wire strippers provided in the tool kit, 1.5 inches of the outer jacket or shielding is removed on the fiber cable end, exposing the aramid mesh. The process is repeated for both fiber cable ends to be spliced.

A length of heat shrink tubing is provided in the fiber optic splice kit for final environmental sealing. That tubing is slid over one end of the fiber to be spliced past the prepared area of fiber. The tubing is applied later in the process.

After removal of the outer shielding, the aramid mesh is exposed. The mesh is carefully rolled back over the un-stripped outer shielding. Using the FOKC cutters, the excess aramid mesh is trimmed away, being careful to not damage the fiber underneath. Alternatively, as described above, the aramid mesh may be left intact and a ferrule may later be placed between it and the underlying inner jacket layer.

The fiber cable ends are then inserted into an inner (Tefzel®) jacket stripper tool provided in the tool kit. A built-in stop provides feedback for length of trimming. The handles of the tool are squeezed and the fiber cable is gently pulled, removing the Tefzel® Jacket.

An inner crimp sleeve is then assembled over each exposed fiber, with the fiber entering the sleeve from the first end, which has the larger diameter bore. The sleeve is slid until it bottoms out and the fiber projects from the second end of the sleeve.

A specially designed crimping tool provided in the splice tool kit has three separate crimping dies built into the tool. Working from the inside of the tool out, the first crimping die is used for the inner crimp sleeve crimps. The middle crimping die is for the first of two crimps on the outer cannula, and the third or outside crimping die is for the final crimp on the outer cannula.

To crimp the inner crimp sleeve to the fiber cable end, the first crimping die on the crimpers is used. The back side of the inner crimp sleeve is aligned with the outside edge of the crimpers, and the crimper handles are squeezed until they lock and release. That process is repeated on both ends of the fiber to be spliced.

As described above, a special cleaving tool is provided in the splice tool kit for scoring the fiber circumferentially before cleaving. The cleaving tool is operated by first pressing and holding a button on the thumbwheel. The prepared fiber is then inserted into the cleaving tool, assuring that the fiber is straight and not held at an angle. A stop on the cleaving tool abuts the inner crimp sleeve, ensuring proper length of cleave.

The button on the thumbwheel is then released to lock the fiber in place. The thumbwheel is rotated one full turn in either direction to cut through the polyimide fiber coating and to score the fiber in a full circumference. The circumferential score results in a cleaner and straighter cleave surface.

One of the prepared fibers is then inserted into the outer splice sleeve (step 1320). Once one end of the fiber has been cleaved, it is immediately inserted into one end of the outer crimp assembly. Doing so immediately will limit the possibility for contamination to the prepared end. The inner crimp sleeve abuts the glass ferrule, ensuring that the fiber end position is correct within the outer crimp assembly.

The first fiber end position is then visually verified within the splice. The magnifier is clipped on the outer cannula in registration with the view port and the backlighting port in the cannula. Using the magnifier to observe the view port, the position of the backlighted fiber is observed within the outer crimp assembly. The cleaved fiber end should be located at the approximate midline of the viewing window. Stops will ensure accurate positioning of the fiber.

The first of two crimps is then made on the outer cannula. The outer cannula is placed in the second crimping die on the crimping tool. A flat side of the crimpers is held against the flat on the side of the magnifier in order to properly position the crimp. The crimpers are then squeezed until they lock and release.

Once the splice installation process has been completed for one end of the fiber to be repaired, all fiber preparation steps are repeated for the opposing end of the fiber to be repaired. The second prepared fiber cable end is then inserted into the outer crimp assembly. The two prepared, cleaved core fiber ends are inspected through the magnifier (step 1330) to verify that they have both been successfully introduced into the glass ferrule, are abutting, that the ends are clean, and that they have not been damaged during installation in the outer crimp assembly. After the splice has been verified through visual inspection, the second end of the outer cannula is placed in the second crimping die of the crimping tool, butted against the second flat on the magnifier, and the second inner crimping sleeve is secured in the outer crimp assembly (step 1340).

The final crimps are then applied to the outer crimp assembly. The crimping tool is turned over so that the flat side of the tool faces away from the magnifier. The edge of the crimpers is aligned with the edge of the outer sleeve where the fiber enters the splice, and the outer crimp assembly is placed in the third or outside crimping die on the tool. The crimping tool handles are then squeezed until they lock and release. That process is repeated for both sides of the splice.

After the final crimps have been made and the splice is again inspected through the magnifier and view port, the heat shrink tubing is slid over the splice and heated to seal the splice.

Another splicing method in accordance with the invention is shown in FIG. 14. For each of the first and second fiber ends, sheathing is removed from the fiber cable ends to expose a fiber (step 1410) and a complete circumference of the exposed fiber is scored to form a circumferential score (step 1420). As the fiber is scored, a polyimide coating is penetrated. The exposed fiber is cleaved (step 1430) at the score. As discussed above, the inventors have discovered that by circumferentially scoring the fiber, a cleaner and straighter cleave surface results. The cleave surface is of sufficiently high quality to eliminate the need to polish the cleaved ends before splicing. Cleaved ends that have not been subsequently polished are referred to herein as being in a "cleaved condition." The prepared first and second cleaved fiber ends, in their cleaved condition, are inserted (step 1440) into opposite ends of a ferrule containing an index matching gel.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. For example, while the methods and apparatus of the invention are described herein with respect to temporary fiber splices such as those used in ABDR operations, the inventive concepts are equally applicable to any multimode mechanical splice, and also to single mode splices and to fusion splices. It is to be understood that the embodiments shown and described herein are only illustrative of the principles of the present invention and that various modifications may be implemented by those skilled in the art without departing from the scope and spirit of the invention.

What is claimed is:

1. A method for splicing first and second optical fiber cable ends, the method comprising:
   preparing the first and second optical fiber cable ends;
   inserting the prepared first and second fiber cable ends into opposite ends of an outer splice assembly, wherein projecting fiber portions of the prepared fiber cable ends enter an alignment bore of a glass ferrule positioned in a central bore of the outer splice assembly as the prepared fiber cable ends are inserted;
   backlighting the projecting fiber portions through a backlighting port in the outer splice assembly and through the glass ferrule;
   visually inspecting the backlighted projecting fiber portions through a view port in the outer splice assembly and through the glass ferrule; and
   fixing the outer splice assembly to at least one of the prepared first and second optical fiber cable ends.

2. The method of claim 1, wherein visually inspecting further comprises:
   installing a magnifier over the view port.

3. The method of claim 2, wherein backlighting the projecting fiber portions further comprises backlighting through a background optical diffuser contained in the magnifier.

4. The method of claim 2, wherein installing the magnifier over the view port comprises clipping the magnifier to the outer splice assembly.

5. The method of claim 1, wherein preparing the first and second optical fiber cable ends further comprises performing the following on each fiber cable end:
   removing from the optical fiber cable end a length of outer jacket to expose a length of inner jacket;
   removing a portion of the exposed length of inner jacket to expose a length of fiber;
   inserting the fiber cable end into a first end of a respective inner crimp sleeve, the inner crimp sleeve having a through bore with a large diameter section for receiving the exposed inner jacket and a small diameter section for receiving the exposed fiber, the exposed fiber projecting from a second end of the respective inner crimp sleeve to form the projecting fiber portion;
   crimping the inner crimp sleeve to secure the fiber end; and
   cleaving the projecting fiber portion a predetermined distance from the respective inner crimp sleeve.

6. The method of claim 5, wherein the cleaving further comprises scoring a coating of the fiber.

7. The method of claim 5, wherein the cleaving further comprises scoring around a complete circumference of the fiber at a cleave point.

8. The method of claim 1, wherein the central bore of the glass ferrule contains an index matching gel.

9. The method of claim 1, wherein the central bore of the glass ferrule has a triangular cross section.

10. The method of claim 1, wherein the central bore of the glass ferrule includes lead-in chamfers to guide the projecting fiber portions into the central bore.

11. The method of claim 1, further comprising:
    rotating the fiber ends relative to each other before fixing the outer splice assembly to the fiber cable ends;
    measuring signal strength across the splice during the rotating; and
    performing the fixing at a relative rotational position of the fiber ends resulting in a maximum signal strength.

12. The method of claim 1, further comprising:
    applying an adhesive-lined shrink wrap sleeve over the splice after fixing the outer splice assembly to the fiber cable ends.

13. The method of claim 1, further comprising:
    capturing strength members of the first and second optical fiber cable ends.

14. A splicing kit for splicing first and second optical fiber cable ends, comprising:
    an outer splice assembly including an outer cannula and a glass ferrule positioned in a central bore of the outer cannula, the glass ferrule having a fiber alignment bore for receiving first and second fiber ends of the first and second fiber cable ends, the outer cannula defining a viewing port through a wall of the cannula in registration with the glass ferrule; the outer cannula further defining a backlighting port through the wall of the cannula in registration with the glass ferrule, the viewing port and the backlighting port being in opposing positions on the cannula wall, the fiber alignment bore being in a line of sight between the backlighting port and the viewing port.

15. The kit of claim 14, further comprising:
    a viewing magnifier for viewing the central bore of the glass ferrule, the magnifier being configured for attachment to the outer splice assembly, the magnifier having a lens in registration with the viewing port and a background optical diffuser in registration with the backlighting port when the magnifier is attached.

16. The kit of claim 14, wherein the glass ferrule further comprises lead-in chamfers at both ends of the alignment bore.

17. The kit of claim 14, wherein the alignment bore of the glass ferrule is triangular in cross section.

18. The kit of claim 14, further comprising an index-matching gel contained within the central bore of the ferrule.

19. The kit of claim 14, further comprising two inner crimp sleeves, each sleeve comprising a cylindrical body with an inner bore for receiving one of the first and second optical fiber cable ends and an outer diameter for fitting in the central bore of the outer cannula.

20. The kit of claim 14, wherein the central bore of each of the inner crimp sleeves further comprises a single diametric step separating a first bore length sized to accept an inner jacket layer of the fiber cable, and a second bore length sized for accepting a core fiber of the fiber cable.

21. A splicing kit for splicing first and second optical fiber cable ends, comprising:
- an outer splice assembly including a cylindrical outer cannula and a glass ferrule positioned in a central bore of the outer cannula, the glass ferrule having a fiber alignment bore for receiving first and second fiber ends of the first and second fiber cable ends, the outer cannula having a single outer diameter for its length;
- first and second inner crimp sleeves, each sleeve comprising a cylindrical body with an inner bore for receiving one of the first and second optical fiber cable ends and an outer diameter for fitting in the central bore of the outer cannula adjacent the glass ferrule;
- first and second strength fiber ferrules for inserting inside a strength fiber layer of the fiber optical cable;
- the outer cannula having a length sufficient to accommodate the strength fiber ferrules on sides of the inner crimp sleeves opposite the glass ferrule, the cannula being crimpable over the first and second inner crimp sleeves and the first and second strength fiber ferrules.

22. The kit of claim 21, further comprising:
- a polyimide sleeve for surrounding the strength fiber of the optical fiber cable along a length of the ferrule.

23. The kit of claim 21, wherein the central bore of each of the inner crimp sleeves further comprises a single diametric step separating a first bore length sized to accept an inner jacket layer of the fiber cable, and a second bore length sized for accepting a core fiber of the fiber cable.

24. A method for splicing first and second optical fiber cable ends, the method comprising:
- preparing the first and second optical fiber cable ends by:
  - exposing lengths of a core glass fiber, an inner jacket layer, and a strength fiber layer;
  - inserting a metallic ferrule between each exposed length of strength fiber layer and an underlying length of inner jacket layer;
  - inserting each fiber cable end into a first end of a respective inner crimp sleeve, the inner crimp sleeve having a through bore with a large diameter section for receiving the exposed inner jacket and a small diameter section for receiving the exposed fiber, the exposed fiber projecting from a second end of the respective inner crimp sleeve to form a projecting fiber portion;
  - crimping each inner crimp sleeves to secure a fiber end; and
  - cleaving the projecting fiber portions a predetermined distance from the respective inner crimp sleeve;
- inserting the prepared first and second fiber cable ends into opposite ends of a cannula having a single outer diameter for the length of the cannula, wherein projecting fiber portions of the prepared fiber cable ends enter an alignment bore of a glass ferrule positioned in a central bore of the cannula as the prepared fiber cable ends are inserted; and
- crimping the cannula over each of the inner crimp sleeves and each of the metallic ferrules to fix the core glass fibers and the strength fiber layers to the cannula.

25. The method of claim 24, further comprising:
assembling a polyimide sleeve over the strength fiber layer before inserting the prepared fiber ends into the cannula.

26. The method of claim 24, further comprising:
applying an adhesive-lined shrink wrap sleeve over the splice after fixing the outer splice assembly to the fiber cable ends.

* * * * *